May 7, 1957 H. B. BARRETT 2,791,072
BRAKE SHOE AND BRAKE DRUM SURFACERS
Filed Sept. 14, 1955 2 Sheets-Sheet 1
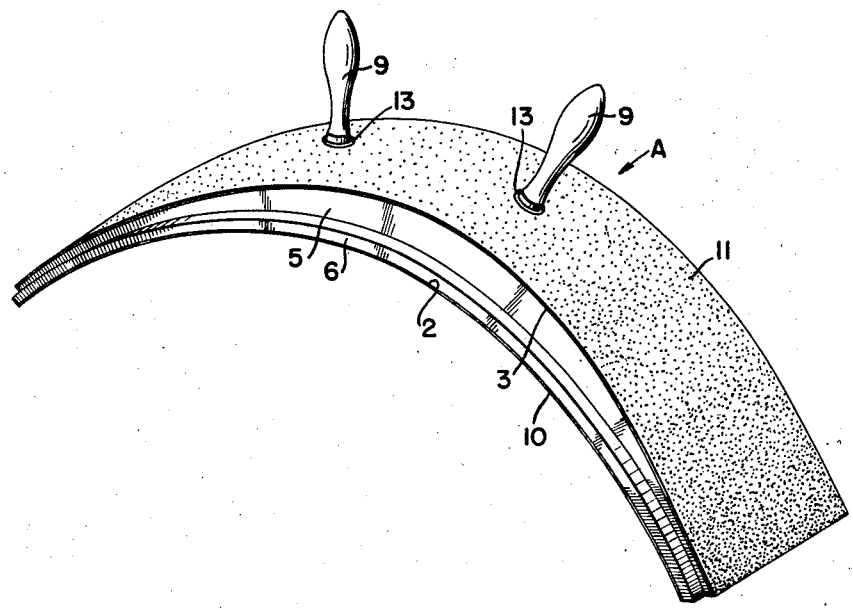
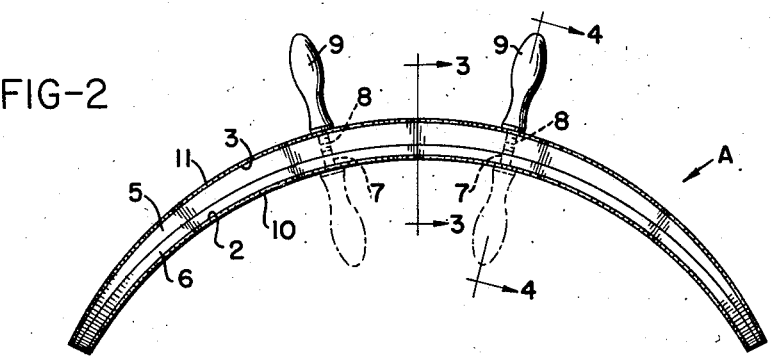
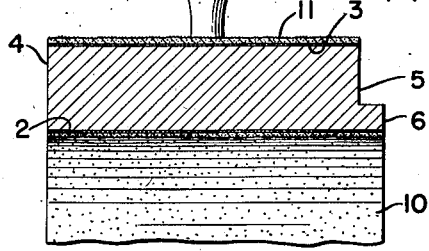
INVENTOR.
HARRY B. BARRETT
ATTORNEY May 7, 1957     H. B. BARRETT     2,791,072
BRAKE SHOE AND BRAKE DRUM SURFACERS
Filed Sept. 14, 1955     2 Sheets-Sheet 2

*INVENTOR.*
HARRY B. BARRETT
BY *Alfred W Petchoft*
ATTORNEY

United States Patent Office 2,791,072
Patented May 7, 1957

2,791,072

BRAKE SHOE AND BRAKE DRUM SURFACERS

Harry B. Barrett, Clayton, Mo.

Application September 14, 1955, Serial No. 534,244

10 Claims. (Cl. 51—186)

This invention relates in general to certain new and useful improvements in automobile brake repair tools and, more particularly, to a brake shoe and brake drum re-surfacing device.

It has become established practice in the repair and maintenance of automotive brake systems to grind the drum contacting surface of the automobile brake shoes with the use of a motor driven grinder mounted upon some sort of bearing or spindle, which is, in turn, mounted upon the axle spindle of the automobile itself. By this procedure, it is possible to apply a truly concentric surface to the brake shoe and insure proper braking contact with the surface of the brake drum when the brake is actuated during use. This procedure, of course, achieves a highly satisfactory and accurate result, but involves the utilization of mechanical equipment and some degree of training and skill on the part of the mechanic who uses the machinery to accomplish this type of repair work in relining brakes and even in the setting of brakes as the automobile is being built at the factory. These procedures are well within the skill of the factory workmen or the workmen at the automobile repair establishment. However, the widespread use of automatic transmissions has imposed upon the braking mechanism of automobiles additional burdens which require more frequent adjustment and checking. For such purposes, the mechanical type of grinder or spindle-mounted concentricity gauge is relatively costly and time-consuming.

It is, therefore, the primary object of the present invention to provide a single unitary tool which can be used for gauging the accuracy, concentricity, and surface contour of a brake drum or brake shoe and can also be used for removing the glaze from brake shoe and brake drum surfaces, while at the same time restoring concentricity and removing high spots therefrom when such defects become apparent.

It is another object of the present invention to provide a hand tool of the type stated which can be utilized while the brake shoes are still in operating positions and with the brake drum still mounted on the wheel.

It is also an object of the present invention to provide a hand tool of the type stated which is simple and convenient to use, requiring no special training or skill on the part of the mechanic.

It is an additional object of the present invention to provide a hand tool of the type stated having a readily and conveniently replaceable abrasive or sanding element and one which lends itself quite readily to modification of size, so that the tool itself can be readily adapted for sanding undersized and oversized surfaces within the practical limits required for automobile braking devices.

With the above and other objects in view, my invention resides in the novel features of form, construction, arrangement, and combination of parts presently described and pointed out in the claims.

In the accompanying drawings (two sheets)—

Figure 1 is a perspective view of a brake drum and brake shoe surfacing device constructed in accordance with and embodying the present invention;

Figure 2 is a side elevational view of the brake drum and brake shoe surfacing device;

Figure 4:
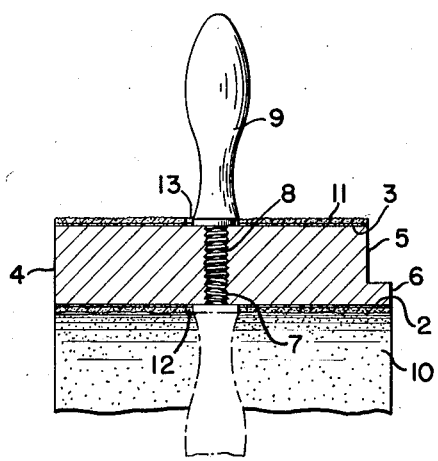
Figure 5:
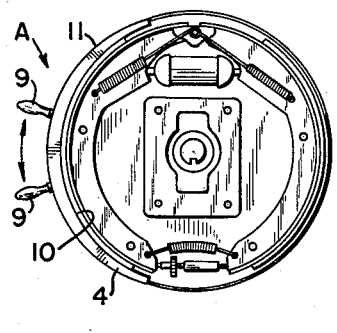
Figure 6:
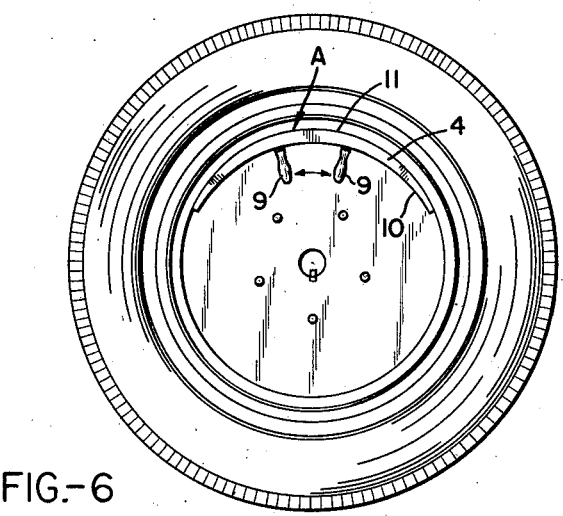

Figures 3 and 4 are traverse sectional views taken along lines 3—3 and 4—4, respectively, of Figure 2;

Figure 5 is an end elevational view of the brake shoe and brake drum surfacing device in operative position with respect to a brake shoe; and Figure 6 is a side elevational view of the brake drum and brake shoe surfacing device in operative position in relation to a brake drum.

Referring now in more detail and by reference characters to the drawings, which illustrate a preferred embodiment of the present invention, A designates a brake drum and brake shoe surfacing device comprising a preferably solid arcuate segment 1 having oppositely presented arcuate faces 2, 3. These arcuate faces 2, 3 are machined accurately to conform to segments of matching cylindrical surfaces, to which the brake drum and brake shoe should conform. Thus, the surface 2 conforms to the shape and curvature of the surface of the brake shoe and the surface 3 conforms to the surface of the brake drum into which the brake shoe must fit. Most automotive brake systems currently in use today, employ either 10", 11", or 12" shoes and drums. Consequently, if the tool A is designed for use with a 10" brake shoe and drum size, the surface 2 will be machined to a 10" diameter and the surface 3 will be similarly machined to a 10" diameter. Since the surfaces 2, 3 are of the same diametral size and are located on opposite faces of the tool A, they cannot, of course, be concentric and the tool A will, therefore, assume the somewhat crescent shape shown in the drawings. The surfaces 2, 3, however, are precisely cylindrical and, therefore, the transverse axial line of the surfaces 2, 3 will be parallel as shown in Figures 3 and 4.

The tool A, furthermore, is provided with one side face 4, which is flat and an opposite side face 5, which is provided with an outwardly protruding marginal flange 6, which is relatively thin and is adapted to fit into the annular space between the surface of the brake shoe and the rim of the backing plate, so that the entire surface of the brake shoe can be covered by the tool A when in actual use.

At equal distances on opposite sides of the transverse centerline of the tool A and along the longitudinal centerlines thereof are radial bore-holes 7, which are internally threaded and open at their opposite ends upon the surfaces 2, 3, respectively, for receiving the threaded end 8 of small handle members 9, which may be inserted from either side so as to assume either of the positions shown in full lines or dotted lines in Figures 2 and 4.

Provided for co-operation with the tool A are two rectangular pieces of abrasive material 10, 11, formed preferably of tightly woven cloth or heavy flexible paper coated upon one face with an abrasive material, such as sand or emergy particles and upon the other face with a pressure sensitive adhesive. The strip 10 is wider than the strip 11 since it must extend all the way across the surface 2 to the full width thereof, including the flange 6, whereas the strip 11 is somewhat narrower to fit the somewhat narrower surface 3. The abrasive strips, furthermore, are provided with relatively large apertures 12, 13, respectively, coincident with the bores 7 and of substantially larger size than the circular size of the handles 9 to afford clearance with respect thereto. The strips 10, 11, can be readily applied to the surfaces 2, 3, and the handles 9 installed in either of the two optional positions, whereupon, the tool A is ready for use. In this connection, it should be pointed out that the thickness of the strips 10, 11, is precisely selected so that the abrasive surface will have a precise diametral size. If it is desired to provide for oversize or undersize finishing, the strips 10, 11, can be provided in greater or lesser thicknesses within a range of .030" to .060".

In use, the tool A can be applied to a brake shoe in the manner shown in Figure 5 or to a brake drum in the manner shown in Figure 6. The mechanic, by laying the tool A against the brake shoe or brake drum in the manner shown, can additionally determine whether or not the drum or shoe is properly sized. If the tool A fits snugly down against the shoe or drum without wobbling, the mechanic will know that the drum or shoe has the proper size. As was above pointed out, there are a limited number of standard sizes currently employed on automotive vehicles, therefore, the mechanic may be supplied with a set of several of the tools A, each sized for a particular standard type of drum and shoe size. Thus, if the mechanic has an automobile to deal with which is fitted with 10" brakes, he will select the 10" size of the tool A. On the other hand, if the automobile on which he is working happens to have an 11" brake, then he will select the tool A which is adapted for that particular size. By applying the tool A to the brake shoe and brake drum, it is also possible for the mechanic to locate any high spots or distortions in the surfaces of the brake shoe or the brake drum. Finally, it is possible, by sliding the tool backward and forward across the surface of the brake shoe or the brake drum in the direction shown by the arrows in Figures 5 and 6, to smooth off the surfaces of the brake shoe and brake drum to remove therefrom any of the glaze which quite frequently forms as a result of braking the vehicle at high speeds. Such glaze is commonly known to produce squealing of the brakes and this condition can be very quickly corrected by removing the glaze in the manner just described. This procedure also will serve to remove any minor scratches or score lines which may be formed in the surfaces of the brake shoe or brake drum, as the case may be, and also will work the brake shoe and brake drum down to proper diametrical size and interfitting relationship where that may be necessary. It will, therefore, be evident that the tool A provides the brake mechanic with a means for very quickly and conveniently checking the brake drum and brake shoe of an automotive vehicle and correcting various commonly encountered defects therein. Furthermore, whenever the abrasive strips 10, 11, become worn, they can be very readily peeled off and replaced in a matter of seconds, so that the tool A will always be accurate in size and efficient so far as its abrading characteristics are concerned.

It should be understood that changes and modifications in the form, construction, arrangement, and combination of the several parts of the brake shoe and brake drum surfacers may be made and substituted for those herein shown and described without departing from the nature and principle of my invention.

Having thus described my invention, what I claim and desire to secure by Letters Patent is:

1. A combined brake shoe and brake drum maintenance tool comprising an arcuate segment having spaced oppositely presented faces which are abrasive-coated and which define segments of cylindrical surfaces of substantially the same diameter, said faces conforming respectively to the matching faces of a brake drum and brake shoe which are adapted for operative inter-engagement with each other.

2. A combined brake shoe and brake drum maintenance tool comprising an arcuate segment having spaced oppositely presented faces which are abrasive-coated and which define segments of cylindrical surfaces of substantially the same diameter, said faces conforming respectively to the matching faces of a brake drum and brake shoe which are adapted for operative inter-engagement with each other, said surfaces being abrasive in character for removing a superficial portion of the brake shoe and brake drum when manually reciprocated thereacross.

3. A combined brake shoe and brake drum maintenance tool comprising an arcuate segment having spaced oppositely presented faces which are abrasive-coated and which define segments of cylindrical surfaces of substantially the same diameter, said faces conforming respectively to the matching faces of a brake drum and brake shoe which are adapted for operative inter-engagement with each other, and handles operatively associated with said segment.

4. A combined brake shoe and brake drum maintenance tool comprising an arcuate segment having spaced oppositely presented faces which are abrasive-coated and which define segments of cylindrical surfaces of substantially the same diameter, said faces conforming respectively to the matching faces of a brake drum and brake shoe which are adapted for operative inter-engagement with each other, and radially projecting handles operatively associated with said segment.

5. A combined brake shoe and brake drum maintenance tool comprising an arcuate segment having spaced oppositely presented faces which are abrasive-coated and which define segments of cylindrical surfaces of substantially the same diameter, said faces conforming respectively to the matching faces of a brake drum and brake shoe which are adapted for operative inter-engagement with each other, and radially projecting handles removably mounted on the segment.

6. A combined brake shoe and brake drum maintenance tool comprising an arcuate segment having spaced oppositely presented faces which are abrasive-coated and which define segments of cylindrical surfaces of substantially the same diameter, said faces conforming respectively to the matching faces of a brake drum and brake shoe which are adapted for operative inter-engagement with each other, and sections of thin abrasive material removably attached to said oppositely presented faces.

7. A combined brake shoe and brake drum maintenance tool comprising an arcuate segment having spaced oppositely presented faces which are abrasive-coated and which define segments of cylindrical surfaces of substantially the same diameter, said faces conforming respectively to the matching faces of a brake drum and brake shoe which are adapted for operative inter-engagement with each other, radially projecting handles removably mounted on the segment, and sections of thin abrasive material removably attached to said oppositely presented faces.

8. A combined brake shoe and brake drum maintenance tool comprising an arcuate segment having spaced oppositely presented faces which are abrasive-coated and which define segments of cylindrical surfaces of substantially the same diameter, said faces conforming respectively to the matching faces of a brake drum and brake shoe which are adapted for operative inter-engagement with each other, said segment being provided with a plurality of radial bore-holes accessible from either of the oppositely presented faces, and handle means removably mounted in said bore-holes.

9. A combined brake shoe and brake drum maintenance tool comprising an arcuate segment having spaced oppositely presented abrasive surfaces defining segments of cylindrical surfaces of substantially the same diameter, said faces conforming respectively to the matching faces of a brake drum and brake shoe which are adapted for operative inter-engagement with each other, one of said faces being substantially wider than the other face.

10. A combined brake shoe and brake drum maintenance tool comprising an arcuate segment having spaced oppositely presented faces defining segments of cylindrical surfaces of substantially the same diameter, said faces conforming respectively to the matching faces of a brake drum and brake shoe which are adapted for operative interengagement with each other, and sections of thin abrasive material removably attached to said oppositely presented faces, said tool, furthermore, being provided along one lateral margin with an outwardly protruding marginal flange having a curved surface which is a continuation of and part of one of said faces whereby said faces are of different transverse widths.

References Cited in the file of this patent

UNITED STATES PATENTS

Re. 23,364     Titcomb _____ May 8, 1951